Jan. 19, 1954 H. E. KAMINKY 2,666,379
AUTOMATIC COFFEE URN AND CONTROL THEREFOR
Filed June 8, 1949 3 Sheets-Sheet 2

Inventor
Herbert E. Kaminky
By The Firm of Charles W. Hills, Attys

Jan. 19, 1954 H. E. KAMINKY 2,666,379
AUTOMATIC COFFEE URN AND CONTROL THEREFOR
Filed June 8, 1949 3 Sheets-Sheet 3

Inventor
Herbert E. Kaminky
By The Firm of Charles W. Hills Attys

Patented Jan. 19, 1954

2,666,379

UNITED STATES PATENT OFFICE 2,666,379

AUTOMATIC COFFEE URN AND CONTROL THEREFOR

Herbert E. Kaminky, Chicago, Ill., assignor to The Superior Tea and Coffee Company, Chicago, Ill., a corporation of Illinois Application June 8, 1949, Serial No. 97,886

10 Claims. (Cl. 99—282)

1

This invention relates to an improved automatic coffee urn of the type utilized in restaurants, hotels and similar institutions, and also to an improved control system for controlling the operation of the automatic coffee urn.

This application is a continuation-in-part of a copending application of Herbert E. Kaminky, Serial No. 44,097, filed August 13, 1948, entitled "Control for Automatic Coffee Urn" issued November 22, 1949, as United States Patent No. 2,488,817.

It is an object of this invention to provide an improved control system for a coffee urn of the automatic type.

A further object of this invention is the provision of a control system for a coffee urn wherein an electrical water level detecting device operates in conjunction with relay elements to insure that a minimum water level will be maintained within the water heating chamber of the coffee urn, and furthermore, to automatically fill the water heating chamber to a predetermined maximum level whenever the water level therein falls to the aforementioned minimum level.

Still another object of this invention is to provide a novel control system for automatic coffee urns.

It is a very important object of this invention to provide a control system for an automatic coffee urn which is substantially fool-proof and which will safely operate to uniformly brew coffee, irrespective of improper control switch actuation that may be inadvertently produced by an inexperienced operator.

The specific nature of the invention, as well as other objects and advantages thereof, will become apparent to those skilled in the art from the following detailed description of the annexed sheets of drawings which, by way of preferred example only, illustrate one specific embodiment of the invention.

Figure 1:
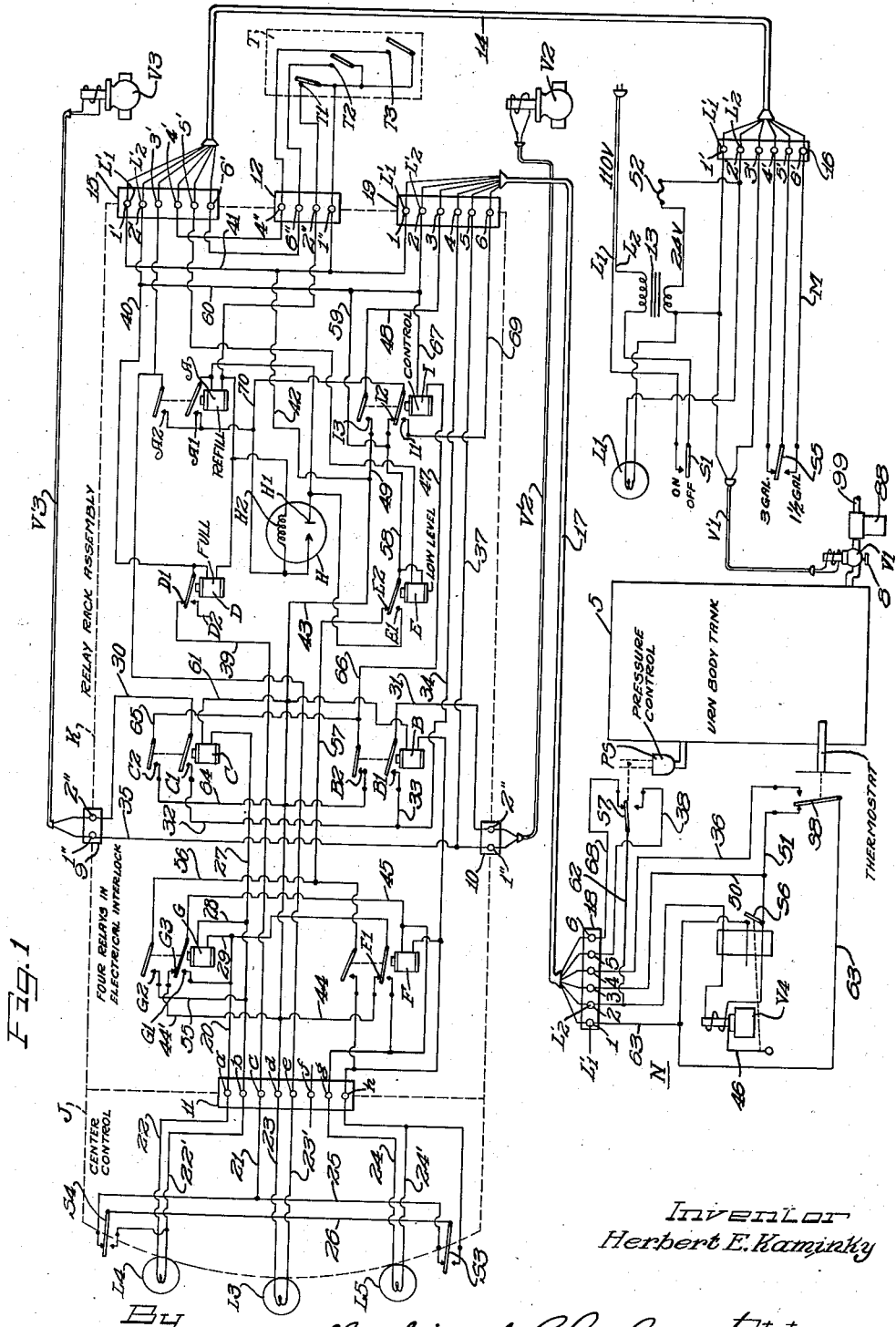
Figure 1 is a schematic circuit diagram of a control system for automatic coffee urns embodying this invention.

The control system embodying this invention may be applied to any one of a variety of well known forms of coffee urns which are commercially available. In a common form of such coffee urns, an inverted T shape closed water heating chamber 5 is provided as well as a pair of coffee brewing chambers 6 and 7. Fresh water is supplied to such heating chamber from an ordinary city water supply line 99 through an electrically operated shut-off valve VI which is of conventional construction.

The level of water attained in the water heating chamber 5 is determined by a fluid level responsive unit T, which is here shown as comprising three float controlled switches TI, T2 and T3, respectively, which are operated, respectively, at the full level of water in the water heating chamber and at two lower levels by a single float 100 which actuates the switches magnetically as it passes thereby. For example, the switch T2 may be operated at half-full level, while the switch T3 is operated at a substantially empty level of water in the water heating chamber. While the water level determining device T may likewise constitute any one of several well known constructions, it preferably is constructed and operated in a manner similar to that described and claimed in my copending application, Serial No. 44,098, filed August 13, 1948, now Patent No. 2,524,261, for "Liquid Level Electrical Transmitter." The switch TI is open when the water heating chamber is full and the switches T2 and T3 are also open. As the water level falls below the predetermined actuating level of switches TI, TI closes, while T2 closes when the fluid in chamber 5 is at the half-full level and T3 closes when the fluid is substantially at the empty level. The switch T2 closes and opens at a position one and one-half gallons below full position, whereas switch T3 closes and opens at a position three gallons below full position.

A pressure switch PS is mounted in direct communication with the water heating chamber and above the maximum water level thereof and is normally closed in one position as the pressure increases and normally open in the other position, and is arranged to close its contacts whenever the fluid pressure in such chamber attains a value commensurate to a temperature of the water therein which is proper for coffee brewing purposes. The pressure control switch PS operates substantially at one pound gauge pressure. The switch returns to position shown as the pressure falls. With a thermostatic control switch S8 in the control circuit when water transfer set buttons S4 or S3 are set to transfer water, relay I opens a gas valve V4 to keep the urns boiling, thus cutting out the thermostat switch S8 which is set for 208° F. However, to prevent water transfer when the unit is cold, the other side of the water transfer circuit is controlled by the thermostat S8. The temperature must be at the high point of the thermostat or above to close the circuit to permit water transfer.

A pair of coffee brewing chambers 6 and 7 (as may be seen best in Figure 3), are associated with the water heating chamber 5 to receive hot water therefrom through water transfer conduits 101 and 102 and spray heads 103 and 104, respectively, the water being sprayed into intimate contact with freshly ground coffee disposed in the brewing chambers 6 and 7. Below brewing chambers 6 and 7 are glass jars 105 and 106, respectively, which receive the brewed coffee.

In accordance with this invention, electrically operated valves are provided which control the transfer of hot water from the water heating chamber into the coffee brewing chambers. In the particular example illustrated in the drawings, it is assumed that two such coffee brewing chambers are provided, and hence electrically operated valves V2 and V3, respectively, control the transfer of hot water to such chambers.

As will be later described in detail, the amount of hot water transferred from the water heating chamber to any particular coffee brewing chamber is determined by the difference in water volume corresponding to the full level position in the water heating chamber at which the level indicating switch T1 operates and any selected one of the lower levels at which the level indicating switches T2 and T3, respectively, operate. The selection of the desired amount of water for transfer to the coffee brewing chambers is controlled by a manually operable selector switch S5 which has a number of positions equal to the number of low level switches. As shown, the selector switch S5 is manually operable between an upper position wherein the lowest level switch T3 is connected in the control circuit so that three gallons of water may be transferred, and a lower position wherein the intermediate level switch T2 is connected in the control circuit wherein one and one-half gallons of water may be transferred to the coffee brewing chambers, respectively.

To manually effect the refilling of the water heating chamber whenever the water level therein drops below the full position, a manual control knob 8 is provided on the electrically operated valve V1, Figures 1 and 2. To effect the selection of the particular coffee brewing chamber to which hot water will be transferred, a plurality of manually operated switches, equal in number to the number of coffee brewing chambers 6 and 7 are provided which are here shown as the switches S3 and S4, respectively, Figures 1 and 2. Lastly, a main "off-on" switch S1 is provided, which controls the connection of the entire circuit to a suitable source of energizing potential indicated as the lines L1 and L2.

Figure 2:
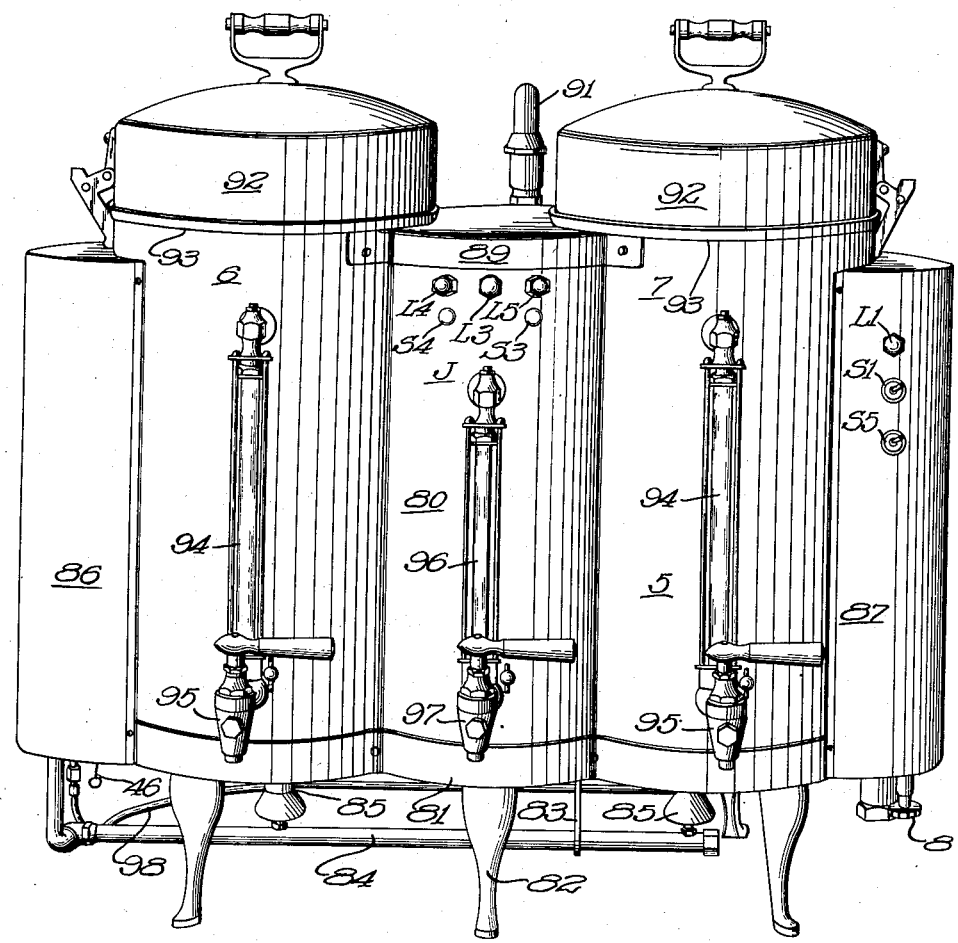
Figure 2 is an automatic coffee urn constructed in accordance with this invention and embodying the control circuit of Figure 1 and illustrating the location of the control switches and indicating lights thereof.

Referring to Figures 1 and 2, the control circuit is made up of several sub-assemblies, a center control circuit J, a relay rack assembly circuit K, a water level electrical detecting device circuit T, electrically operated valve circuits V'3 and V'2 connected to the circuits of the relay rack assembly by the fixed disconnect plugs 9 and 10 provided with suitable male and female connections. The center control circuits J are connected to the relay rack assembly by the quick disconnect plug connection 11 having suitable male and female connections illustrated by the reference characters a, b, c, d, e, f, g, and h. The circuit of the water level electrical detecting device T is connected to the circuit of the relay rack assembly K through a quick disconnect plug connection 12.

A power circuit L1 and L2 suitably connected to line voltage of 110 volts or 220 volts including a transformer 13 for transforming power supply to 24 volts for energizing the control circuit and including the "on-off" switch S1 and the manually operable selector switch S5 is connected to the circuit of the relay rack assembly K by a six wire cable 14. Disconnect plugs 15 and 16 are provided with the terminals as shown to provide ready connection and disconnection of the cable 14 to the circuit of the relay rack assembly K and the power circuit M. The electrical control circuit V'1 of the water inlet valve V1 is connected to the terminals of the quick disconnect plug 16 of the power circuit M, as shown.

The gas valve control circuit N comprising the circuit of the gas valve V4, the thermostat controlled switch S8 and the pressure control switch PS are connected to the six wire cable 17 to the relay rack assembly circuit K. Disconnect plugs 18 and 19, provided with the terminals corresponding to the six wire cable 17 supplies ease in connecting and disconnecting the circuit N to the circuit of the relay rack assembly.

The center control circuit J comprises the switches S3 and S4 which are normally biased closed instead of being biased normally open. The center control circuit J also comprises the indicating lights L5 and L4 which are preferably green to indicate when the corresponding set buttons S3 and S4 are manipulated to fill either of the chambers 7 and 6, respectively, to brew coffee.

The switches S3 and S4 are connected together to conductors 25 and 26, and the conductor 25 is connected to the quick disconnect plug 11 to the terminal c through the conductor 21.

Lights L4, L3 and L5 are connected, respectively, to the terminals a—b, d—e, g—h of the terminal block 11 by conductors 22—22', 23—23' and 24—24'. Male and female terminal blocks form the quick disconnect plug 11. Upon energization, the switch S4 is connected to the terminal b and also upon actuation of switch S3, the switch is connected to the terminal h of the quick disconnect plug 11.

The control circuit embodies nine relays one of which is a thermal control relay H and the other relays are indicated, respectively, by the letters A, B, C, D, E, F, G and I. All of the relays shown on the drawings have their contacts indicated in their normal position, corresponding to the de-energized condition of the relay. These relays are interconnected with the electrically-operated valves V1 through V4, the water level indicating device T, the pressure switch PS and the various manually controled switches S1, S3, S4, S5, S6, and S8, in the manner indicated in detail in Figure 1 of the drawings, and the following sequence of control operations may be produced.

Prior to describing the sequence of the control operation, the water transfer circuit, the interlocking circuit, the gas control circuit and the refill circuit connections will be briefly described.

The water transfer circuit comprises electrically controlled valves V2 and V3 including the conductors V'2 and V'3 connected to the relay rack assembly K through the quick disconnect plugs 9 and 10, and the terminals 1'' thereof are connected through the conductor 35. The relay C has one contact C1 thereof connected to the terminal 2'' of the disconnect plug 9 through a conductor 30. The terminal B1 of the relay B is connected to the terminal 2'' of the disconnect plug 10 through a conductor 31. The other terminals of the relays C and B are connected together through the conductors 32 and 33. The contacts C2 and B2 are connected together at a common point, as shown. The conductor 34 connects the common connection of the conductors 32 and 33 to the terminal 4 of the quick disconnect plug 19. Conductor 36 connects the terminal 4 of the quick disconnect plug 18 to the normally open position of the thermostat controlled switch S8. This circuit controls the temperature of the water transfer operation. Conductor 37 connects the conductor 35 to terminal 5 of the disconnect plug 19 and conductor 38 connects the contact 5 of the disconnect plug 18 in the normally open position of the pressure control switch PS. This circuit controls the pressure of the water transfer operation. The circuit of these conductors of the quick disconnect plugs 18 and 19 are completed through the cable 17.

The interlocking control circuit permits setting of the push button switches S3 and S4, respectively, for controlling the right and left-hand water transfer valves V2 and V3 as follows. The switches S3 and S4 are connected, respectively, to the conductor 25 and the common conductor 21 to the terminal c of the quick disconnect plug 11. Conductor 39 connects the terminal c of the disconnect plug 11 in normally closed position of the relay D, which, in turn, is connected through the conductor 40 with the terminal 2' of the disconnect plug 15. The other side of the interlocking control circuit is connected to the 24-volt circuit beginning at terminal 1' of the disconnect plug 15 through conductors 41, 42 and 43 to the conductors 44 and 44' through the contacts F1 and G3 which control the interlock to prevent a double setting. The conductor 43 continues on and is connected to terminal d on the quick disconnect plug 11. The normally closed position of the contacts G3 and F1 of the relays G and F are connected together by the conductors 44 and 44'. The normally closed position of the contact G3 of the relay G is connected to the relay F through the conductor 45. Relay G, through conductors 28 and 29, is connected to conductors 20 and 27. The terminals 1' and 2' of the disconnect plug 15 forming the 24-volt terminals L'1 and L'2 are connected, respectively, through the cable 14 to similar terminals 1' and 2' of the power circuit M which is energized from the transformer 13 of the 110 or 220-volt power lines L1 and L2 upon closure of the on-off switch S1.

The gas control circuit comprising the solenoid-operated gas valve V4 is operative from the 24-volt circuit provided by the power circuit M. The commercially available gas valve known as "K3H" gas valve includes a manual pull rod 46. The manual control 46 is used when the gas valve is not electrically operated, for example, as in an emergency or for starting. The manual pull rod 46 as it is manually actuated opens the gas valve V4 and closes the switch S6 by an eccentric connection to the normally opened switch S6; and, upon closure of the switch S6 when energized, it trips out the manual control 46. It is not necessary to trip the manual control 46 to change from manual to automatic control. This prevents manual control of the gas valve V4 when the power is on.

The control relay I is connected to the normally opened contacts B2 and C2 which are tied common to the relay band C through the conductor 47. The terminal 3 of the quick disconnect plug 19 is connected to the normally opened contact I3 of the control relay I by the conductor 48. Upon actuation of either switch S3 or S4, relay I is closed upon actuation of either relay B or C which would close contact B2 or C2. Upon closure of contact I3, the gas valve V4 is opened through conductor 49. The terminal 3 of the quick disconnect plugs 18 and 19 connected to the contact I3 are connected to the normally closed position of the thermostat controlled switch S8 through the conductors 50 and 51. The common terminals of the gas control valve circuit N are connected through the common cable 17 to similar contacts of the quick disconnect plug 19. The solenoid is actuated from the 24-volt circuit by the connection of the terminals 1 and 2 of the 24-volt line L'1 and L'2 connected to the disconnect plug 18.

The four relays B, C, F and G form the electrical interlock circuit of which relays B and C control the gas valve V4 through control relay I. The interlocking circuit holds the interlock in until the relay E trips out. The relay E is controlled by switches T2 and T3. The relay D is controlled by switch T1. The relay D controls the full position as actuated through the normally closed switch T1. The contacts of the relay D are closed only when the unit is below full. This is a reversal from the circuit of the aforementioned copending application of which this application is a continuation-in-part. Also, in the aforementioned copending application, the switch T1 is normally opened, but in this improvement, switch T1 is now normally closed. The refill relay A, when the contacts thereof are closed actuates the inlet valve solenoid V1. The thermostat controlled switch S8 in a normally closed position controls the gas flame and in the normally opened position controls the water transfer valve circuit to prevent cold water transfer.

The 110 or 220-volt leads L1 and L2 are operatively connected to a source of alternating current; and, upon closure of the on-off switch S1 causes the energization of the indicating red light L1 of the 24-volt circuit energized through the transformer 13. The 24-volt circuit may be suitably fused at 52. The closing of the switch S1 applies the reduced voltage of 24 volts to the lines L'1 and L'2 of the quick disconnect plugs 15, 16, 18 and 19.

Assuming that the water heating chamber of the coffee urn is substantially empty of liquid at the time the on-off switch S1 is closed, the contacts T2 and T3 are both in their closed position. If the selector switch S5 is set to connect the lowermost liquid level switch T3 into the control circuit, the red light L1 will show, the water inlet valve V1 will be actuated, and the amber light L3 will show. The energization circuit is completed for the coil of relay E through the selector switch S5, through the closed contacts of the lower level switch T3 and through the switch T1 being connected in parallel to the 24-volt power lines L'1 and L'2.

Relay E thereupon shifts its armature to engage contact E1 and to disengage contact E2. Now, a circuit is completed for the energization of the coil of relay A which may be traced through the contact E1 of relay E, through the coil of relay A, through the contacts T1 energized from the contacts L'1 and L'2. In detail, the energizing circuit for relay A may be traced as follows: Line L'1 at disconnect plugs 16 and 15, conductor 41, terminal 1" of disconnect plug 12, full level switch T1, terminal 2", solenoid of relay A, contact E1 of low level relay E, conductor 58, conductor 59, conductor 60, conductor 40, and line L'2 at disconnect plugs 15 and 16.

The energization of relay A first effects a self-locking circuit for the coil of relay A upon the closing of its contact A1 through the lines L'1 and L'2. In detail, the holding circuit for relay A may be traced as follows: Line L'1 at disconnect plugs 16 and 15, conductor 41, terminal 1" of disconnect plug 12, full level switch T1, terminal 2", solenoid of relay A, contact A1, conductor 79, contact I2 of control relay I, conductor 59, conductor 60, conductor 40, and line L'2 at disconnect plugs 15 and 16. In addition, energization of relay A closes the circuit through its contact A2 and closure of this contact effects the energization of the water supply valve V1 through the closed contact A2 of the relay A and the coil of the supply valve V1 through its associated circuit where the coil of the supply valve V1 is connected to the 24-volt line voltage L'1 and L'2.

The opening of the supply valve V1, of course, produces a flow of fresh water into the water heating chamber of the urn and any slight increase in the water level in the urn effects the opening of the low level switch T3. Such opening of the contact T3 effects deenergization of relay E but has no effect upon energization of relay A which is locked in its energized condition by the closing of its contact A1. Hence, water will continue to be supplied to the heating chamber until the full or high level switch T1 of liquid detecting device T is opened from its normally closed position. It is also to be noted that relay D is energized when the unit is below the full position and the contact will be in position D2 with the contact D1 open. Upon the unit being filled, the relay D is deenergized and the switch takes the position to engage contact D1, as shown. This happens when the switch T1, which is normally biased closed, opens upon the level of the liquid reaching the position of the switch T1. Therefore, the utilization of the switch T1 normally closed avoids the necessity of a normally energized relay. The operation of the relay D is just the reverse from the operation disclosed in the copending application where it was a continuous duty relay with the relay energized all the time the unit was full. This improved construction, therefore, reduces burnout.

Water will continue to be supplied to the heating chamber until the full, high level, switch T1 of the liquid level detecting device T is in the position in which it is opened. In this connection, it should be noted that the momentary closure of the intermediate level switch T2 will have no effect on the control circuit because this switch is disconnected from the circuit by the selector switch S5 being in the three-gallon position as shown. If switch S5 is not thrown to the three-gallon position or switch T3 is not closed by liquid level detecting device, thermal relay H will go into operation and after a predetermined delay trips relay A in the same manner as contact E1 of relay E. It is, therefore, apparent that when initially filling the urn from a completely empty condition, it is necessary that the selector switch S5 be at least momentarily connected to select the lowermost level switch T3 in order to initially energize relay E. If this does not trip refill relay A, the automatic relay H will, after a predetermined period. After the relay A is energized, the selector S5 may be shifted to its other position (1½ gallon) shown open at present in Figure 1 to select the intermediate level switch T2 with no effect upon the control operations heretofore described.

Upon the attainment of the full charge of the liquid in the water heating chamber urn, the full level switch T1 opens its contact and deenergizes the circuit for the coil of the relay D. This circuit may be readily traced from line L'1 and to the opposite side of the circuit L'2. The armature of relay D then assumes the position shown in Figure 1 engaging the contact D1. Simultaneously with the deenergization of the relay D, relay A is deenergized. The deenergization of the relay A deenergizes the water inlet valve V1. Hence, when the water heating chamber of the urn is filled with water, all relays are deenergized.

If desired, an indicating light L3 may be connected in the circuit, effectively in parallel with solenoid of the inlet valve V1 and only shows when filling, and thus provides an indication wherever the filling operation is in progress. Light L3 is energized through the upper contact of relay A, and hence, when the relay A is deenergized upon opening of the switch T1, the light L3 is deenergized.

In the event that water is withdrawn from the water heating chamber for purposes other than brewing, the heating element H2 of the thermal relay H will be energized and after a predetermined period of substantially 45 seconds the thermostatic switch H1 will close to energize relay A. This, in turn, controls the water valve V1 to refill the urn, as previously described, to the level controlled by the switch T1. It is apparent that the coil of relay A may be energized by the momentary closing of the thermal relay H and that once the relay A is energized, the holding circuit which is then completed will continue its energization until the water heating chamber is again filled with water up to the level corresponding to that of the full level switch T1. Upon switch T1 being opened, relay A is deenergized.

Whenever it is desired to transfer heated water from the water heating chamber to one of a plurality of coffee brewing chambers, one of the manual switches S3 or S4 corresponding to the selected coffee brewing chamber is actuated. The closure of switch S3 effects the energization of relays F, B and I, and finally the energization of the solenoid control valve V2. Similarly, the closure of the manual switch S4 effects the energization of the relays G, C and I, and the energization of the solenoid controlled valve V3. However, the circuit is so arranged that both valves V2 and V3 can never be concurrently energized. This is accomplished by interlocking connections between the relays F and B and the relays G and C which insures that when one set of relays is energized by the actuation of the corresponding switch, the other set cannot be energized until the water transfer operation into the selected brewing chamber has been completed. An additional safety factor is provided in the three-wire interconnection of the manual switches S3 and S4 in such manner that the simultaneous depression of both the switches S3 and S4 results in no control effects upon the remainder of the control circuits. Since the operation of the relays F and B and their interlocking effects on the relays G and C is identical to the operation of the relays G and C and their interlocking effects on the relays F and B, a detail description will be provided of the operation of only one set of relays, for example, the relays G and C following the actuation of switch S4.

The operation of the manual switch S4 completes an energization of the circuit for the relay G which may be traced as follows: Line L′1, through the upper stationary contact F1 of relay F to coil of relay G, then through lower contact of S4, upper contact of contact S3, upper contact D1 of relay D, back to line L′2.

The energization of relay G first effects a self-locking circuit for the coil of relay G upon the closing of its contact G2. Tracing from the coil of relay G, the circuit is as follows: Conductor 28 to conductor 27 to conductor 55 to contact G2. Upon the closing of armature contact, the circuit is traced through conductors 56, 57 to closed contact E2 of relay E. Contact E2 is connected to line L′2 through conductors 58, 59, 60 to 40 completing the circuit.

The energization of relay G, in turn, effects the energization of relay C as they are connected in parallel by a common conductor 27. The other side of relay coil C is directly to L′1 by conductor 61. The circuit is further traced through conductors 43, 42 and 41 to contact 1′ of disconnect plug 15.

The completion of such self-locking circuit assures that only a momentary actuation of the manual switch S4 is required to establish the water transfer operation, and once started, the water transfer operation will proceed irrespective of subsequent inadvertent release or re-operation of either the manual switch S4 or the manual switch S3.

The energization of the relay C completes an energization circuit for the solenoid of the electrically operated valve V3 through the contacts of the pressure switch PS. If the water heating chamber is at the proper temperature for the coffee brewing operation, the pressure will build up, and normally open contacts of the circuit switch PS will, of course, close and the normally open contact of switch S8 will also close. The circuit will be traced as follows: Starting from line L′2 of disconnect plug 18, the circuit is traced through conductor 62 to movable contact of pressure switch S7 through lower stationary contact of pressure switch S7, conductor 38, point 5 of disconnect plug 18 through cable 17, disconnect plug 19, conductor 37 to common wire 35 of V2 and V3.

Starting from line L′1 of disconnect plug 18, the other side of circuit is completed as follows: From point 1 of plug 18, the circuit is traced through conductor 63, to center contact of thermostat switch S8, its normally opened contact which is now closed, to conductor 36, point 4 of plug 18, cable 17 to plug 19, point 4, conductor 34, conductor 32, and common contacts B1 and C1. Since relay C has been energized and locked closed, the circuit is completed through armature contact of relay C to conductor 30, plug 9, point 2″, cable V′3 and through valve V3 energizing the valve when temperature and pressure are correct.

The energization of relay C also controls the refill circuit through control relay I. The relay I is energized. The circuit for controlling relay I from relay C or B may be traced as follows: Starting from L′1 of receptacle 15, the circuit is through conductors 41, 42, 43, 64 which is common to both relays B and C, points B2 and C2. From the other side of relays B and C, armature contacts B2 and C2 are connected through conductors 65, 66 to the coil of relay I. Line L′2 connects directly to the coil of relay I through conductors 67, 60 and 40 to contact 2′ of disconnect plug 15. Upon closing of contact I1, relay I changes the refill circuit from direct connection to line L′2 to controlling of line L′2 by normally closed contact of switch S7.

At the time when the unit is transferring water, the normally closed contact of switch S7 is open. This opens line L′2 to the refill circuit to prevent refilling during the water transfer operation. This circuit may be traced as follows: Starting from L′2 of disconnect plug 18, point 2, the circuit is through conductor 62, through center contact of switch S7, normally closed contact of switch S7, conductor 68, to point 6 of plug 18, cable 17, contact 6 of plug 19, conductor 69 to contact I1 of relay I (now closed).

Hence, there is no possibility of water being concurrently supplied to the water heating chamber while hot water is being removed therefrom through either of the transfer valves V2 or V3. In this manner, it is assured that any excessive water is not transferred to any coffee brewing chamber. Also V3 or V2 cannot be operated unless thermostat switch S8 is up to temperature to shift S8 from position shown thus preventing cold water transfer.

Water transfer is not only controlled by the movable contact S7 of pressure control switch PS which is set to trip at approximately one pound gauge pressure but is also controlled by the thermostat switch S8. The temperature control S8 is connected to the interlock relay B or C whichever is energized, and when the temperature is above some predetermined point such as 208° F., it will permit water transfer.

Water continues to be transferred to the selected coffee brewing chamber through the valve V3 until the water level in the heating chamber drops to the level of the selected lower level switch T2 or T3 as the case may be. Incidentally, the initial lowering of the water level and the subsequent closing of the full level switch contact T1 has no effect upon the condition of the control circuit, since the relay G has heretofore accomplished a self-locking circuit for itself through the normally closed contact E2 of the relay E. However, when the selected low level switch (here assumed to be T2) is operated to close its contacts, the relay E is energized and the locking circuit for the relay G is broken, thus deenergizing relay G and concurrently deenergizing relays C and I, and hence closing solenoid valve V3. At the same time, the energization of relay E effects the initiation of the refill cycle of operations which was heretofore described.

If desired, indicating lights L5 and L4 may be provided to respectively indicate that a particular brewing chamber is being filled with hot water. The indicating light L4 is connected in parallel with the coil of the relay G by the conductors 22—22′ connected with the terminals *a* and *b* of the disconnect plug 11. Similar connections 24—24′ are made between the indicating light L5 and the coil of the relay F through the terminals *g* and *h* of the disconnect plug 11.

In the event that it is desired to transfer hot water to the brewing chamber corresponding to the manual switch S3, an exactly analogous series of control actions are produced with respect to the relays F and B and I, the pressure switch PS, thermostat controlled switch S8, and the valve V2 as were heretofore described in connection with the operation of the relays G and C, pressure switch PS, thermostat controlled switch S8 and the valve V3. It will also be noted that as described with respect to valve V3 water transfer is controlled by both the thermostat S8 and pressure control switch PS. It is important to note, however, that the interlocking of these two relay circuits completely precludes the possibility of more than one water transfer valve being open at any one time.

From the foregoing description, it is apparent that the control circuit of this invention not only assures the automatic and convenient maintenance of the water in the heating chamber at the prescribed full level therein, but insures that a uniform brew of coffee may be selectively produced in any one of the plurality of coffee brewing chambers. The amount of water transferred to any particular coffee brewing chamber is always the same predetermined volume, depending entirely upon the volume of water in the water heating chamber which will reduce the level thereof from the full level, corresponding to the switch T1, to the level of the particular selected low level switch T2 or T3. Furthermore, the described circuit is completely fool-proof and will not malfunction even though the operator inadvertently attempts to operate the transfer switches S3 or S4 during the water filling operation. Hence, there is no possibility of flooding of either the main heating chamber or any of the brewing chambers and the apparatus is completely safe, even in the hands of an inexperienced operator.

The thermal relay H is incorporated in the circuit, having time delay response characteristics, and this relay is so connected as to function to automatically initiate the refilling operation any time that the water level in the water heating chamber drops below the level corresponding to the full level switch T1. The thermal relay H is adapted to actuate within a predetermined time, preferably with a time delay of substantially 45 seconds which is sufficient to permit withdrawal of hot water for example for making cocoa or for any other purpose for which it is desired to use hot water before the thermostat H1 closes and sets the refill relay A, which, in turn, controls the circuit to fill the hot water tank through the actuation of the valve V1 and associated components.

The relay H is preferably of any conventional type having time delay response characteristics for the reason that it is not desirable for water to be immediately added to the water heating chamber upon the slightest drop of the water level therein from the full level. It will be understood that the water transfer operation through either of the valves V2 or V3 for coffee brewing purposes cannot be initiated until full water level is restored in the water heating chamber and the proper pressure is produced therein to close the contact pressure switch PS.

It need only be pointed out that the energizing coil H2 of the time delay relay H, is energized at any time that the relay I is deenergized, which condition exists at all times when the level of the water in the main heating chamber is below the full level. After a predetermined time delay, the relay H operates to close its contacts H1 which complete an energization circuit for the relay A.

From Figure 1, it will be observed that the energizing circuit for relay H may be traced as follows: Line L'1 at disconnect plugs 16 and 15, conductor 41, terminal 1'' of disconnect plug 12, full level switch T1, terminal 2'', energizing coil H2 of time delay relay H, conductor 70, contact I2 of control relay I, conductor 59, conductor 60, conductor 40, and line L'2 at disconnect plugs 15 and 16.

Thus, the energizing circuit for relay H is under the control of full level switch T1 at all times. Relay H may only be energized when the water in heating chamber 5 is below the predetermined full level, since the contacts of switch T1 are normally closed, but open when the water reaches the full level to open the energizing circuit for relay H.

Figure 3:
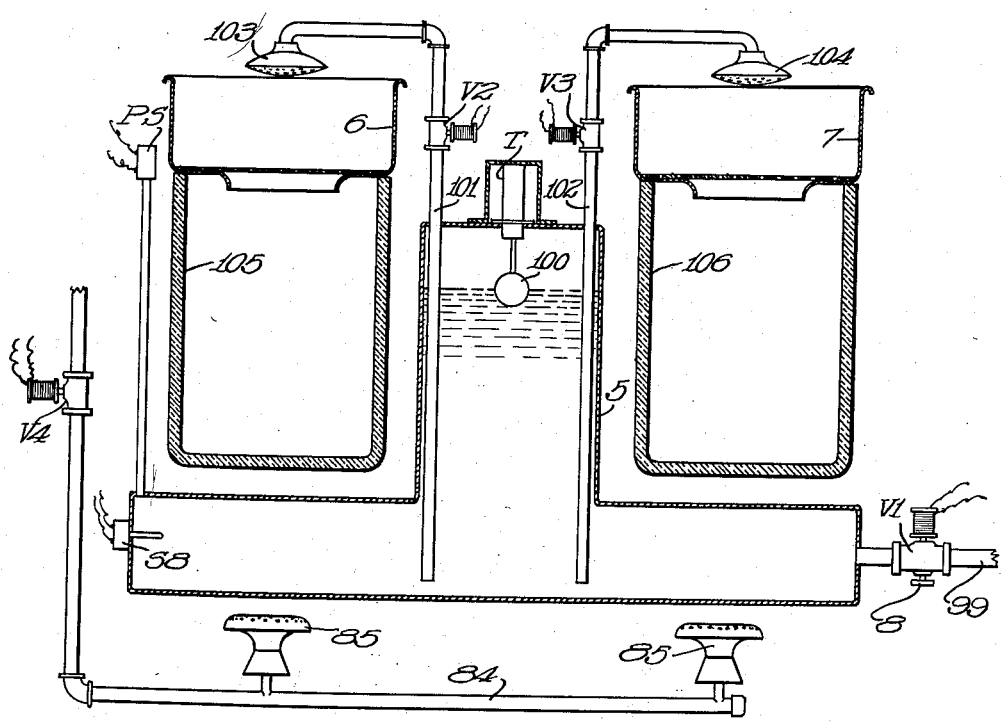
Figure 3 is a schematic vertical section of the automatic coffee urn showing certain of the principal component parts.

Having described in detail the electrical circuit of this invention, the structure of the automatic coffee urn with respect to the relation thereof of certain control mechanism of the electrical circuit will be described with reference to Figures 1, 2 and 3.

The complete coffee urn comprises a number of readily assembled component parts. While the detailed physical construction of these component parts forms no part of the present invention, it may be pointed out that in general the unit includes a body portion 80 which sets on a base 81 having a plurality of legs 82. A gas manifold 84 is supported by one or more strap brackets 83 from the base 81. This manifold 84 is provided with burners 85 positioned below the hot water heating chamber as shown in Figure 3. Side or auxiliary housing members 86 and 87 are provided on opposite sides of the unit to provide suitable protective housings for various component parts of the control apparatus. The gas valve V4, the pressure control switch PS and the thermostat S8 are conveniently mounted on the left side of the urn under housing 86. The inlet valve V1, the transformer 13 and a strainer 88 are mounted within the housing 87. The on-off switch S1, the 1½ and 3 gallon switch S5 and the light L1 which indicates red when the switch S1 is on are mounted on the housing 87.

The urn is provided with a top center portion 89 upon which a safety valve 91 is mounted and connected to the central water heating chamber 5.

The conventional body accessories and fittings such as covers 92, collars 93 and jars 105 and 106 for each of the coffee brewing chambers are also provided. Each of the coffee jars 105 and 106 is provided with a sight glass 94 and a faucet 95. The water chamber 5 is also provided with a sight glass 96 and faucet 97, all of which are conventional.

The manifold assembly includes the gas valve V4 provided with a low flame needle adjustment, manual shut-off (not shown) together with a manual pull wire 46 and a manifold supply line connection 98.

As may be seen in Figure 1, the inlet assembly comprises the inlet valve V1 provided with a manual control 8 and to which is attached the strainer 88. There is also provided two water transfer assemblies comprising the valve V2 and V3 which are attached to their respective conventional spray heads 103 and 104 (Figure 3) for each of the coffee urns.

The on-off panel assembly includes the transformer 13, and the fuse extractor post 15.

The control assembly comprises the water transfer switches S3 and S4 together with the respective water transfer lights L5 and L4 and refill light L3.

The relay rack is positioned behind the center control panel 80 and beneath the center portion 89 and includes all the control relays assembled thereon identified by K of Figure 1 and includes the relays A, I, D, E and H, respectively, the refill relay, the control relay, the full relay, the low level relay and the thermal time delay. The relay rack also has mounted thereon four relays F and B and G and C forming the four relays in electrical interlock in which the switch S3 controls the relays F and G, and the switch S4 controls the relays B and C.

The water level responsive unit T is a separate assembly mounted in the water chamber as disclosed and claimed in the copending application of Herbert E. Kaminky, Serial No. 44,098, filed August 13, 1948, now Patent No. 2,524,261.

The pressure control switch PS and the thermostat controlled switch S8 are also provided by separate assemblies.

From the above description, it will be apparent that I have provided an automatic coffee making apparatus which is extremely reliable and extremely effective. The water heating chamber is provided with an automatic control whereby the level of the water therein is always maintained at a predetermined level. Any water drawn from the body is replenished within a predetermined time delay. The refilling operation is only prevented during an actual water transfer operation from the water heating chamber to one of the coffee brewing chambers. The delivery of a measured quantity of water at a proper coffee brewing temperature is effected by selectively pushing one of the two push button switches S3 and S4. Indicating lights give a visual indication of what operation is taking place. Once the water transfer operation commences it cannot be changed other than by deenergizing the on-off switch S1. When this is done, water transfer will stop and after a predetermined time delay, the water heating chamber will again be refilled automatically. A normal water transfer operation continues until a measured quantity of water has been permitted to flow from the water heating chamber to one of the coffee brewing chambers. By the incorporation of both a pressure control PS, as well as thermostat control S8, it is apparent that provision is made to insure a complete measured quantity of water to the coffee brewing chambers and at the same time prevents inadvertent cold water transfer.

It will, of course, be understood that various details of construction may be modified through a wide range without departing from the principles and teachings of the present invention.

I claim as my invention:

1. A coffee maker comprising a closed water heating chamber, a coffee brewing chamber, a water transfer conduit connecting said heating chamber to said brewing chamber, an electrically operated shut-off valve in said conduit, a thermal responsive device responsive to a predetermined temperature of the water in said water heating chamber including a switch, a pressure responsive device responsive to a predetermined pressure within said water heating chamber including a switch, an actuating circuit for said shut-off valve controlled by both said thermal responsive switch and said pressure responsive switch, said switches both being actuated by the water within said heating chamber being above said predetermined temperature and by there being said predetermined pressure within said heating chamber.

2. A coffee maker comprising a closed water heating chamber, a coffee brewing chamber, a water transfer conduit connecting said heating chamber to said brewing chamber, an electrically operated shut-off valve in said conduit, an actuating circuit for said shut-off valve, first relay means having normally open contacts in said actuating circuit and having a further pair of normally open contacts, a manual switch for controlling the actuating circuit of said first relay means, control relay means having an actuating circuit controlled by said further normally open pair of contacts and having a pair of normally open contacts, an electrically operated water supply valve for controlling introduction of water into said heating chamber, an actuating circuit for said water supply valve including said normally open contacts of said control relay means, a thermal responsive device responsive to a predetermined temperature of the water in said water heating chamber including a switch having normally open contacts in said shut-off valve actuating circuit, a pressure responsive device responsive to a predetermined pressure within said water heating chamber including a switch having normally closed contacts in said water supply valve actuating circuit and having normally open contacts in said actuating circuit for said shut-off valve, whereby when said manual switch is actuated to actuate said first relay means, said control relay means is actuated so that said water supply valve actuating circuit is controlled by said normally closed contacts of said pressure responsive device, and when the pressure in the heating chamber builds up to said predetermined pressure, said pressure switch cuts in the water transfer shut-off valve and cuts out said water supply valve actuating circuit to prevent refilling during the water transfer operation.

3. A coffee maker comprising a closed water heating chamber, a coffee brewing chamber, a water transfer conduit connecting said heating chamber to said brewing chamber, an electrically operated shut-off valve in said conduit, an actuating circuit for said shut-off valve, transfer relay means controlling said shut-off valve actuating circuit, means for actuating said transfer relay means, control relay means having an actuating circuit controlled by said transfer relay means for actuation of said control relay means upon actuation of said transfer relay means, an electrically operated refill valve for controlling introduction of water into said heating chamber, a refill valve actuating circuit controlled by said control relay means, a pressure responsive device responsive to a predetermined pressure within said water heating chamber including a switch having normally closed contacts in said refill valve actuating circuit and having normally open contacts in said shut-off valve actuating circuit, whereby when said actuating means for said transfer relay means is operated, said refill valve actuating circuit is completed through said control relay means and said normally closed contacts of said pressure switch, and when the pressure in said heating chamber builds up to said predetermined pressure, said pressure switch cuts out said refill valve actuating circuit and cuts in said actuating circuit for said shut-off valve through said normally open contacts of said pressure switch.

4. In combination in a coffee maker having a brewing chamber and a water heating chamber and an electrically operated hot water transfer valve controlling transfer of water from said heating chamber to said brewing chamber, an actuating circuit for said hot water transfer valve, transfer relay means controlling said actuating circuit, a thermal responsive device responsive to a predetermined temperature of the water in said water heating chamber including a switch having normally closed contacts and having normally open contacts controlling said actuating circuit for said hot water transfer valve, means for heating the water in said heating chamber, an actuating circuit for said heating means including said normally closed contacts of said thermal responsive device, a further actuating circuit for said heating means by-passing said thermal responsive device switch, control relay means controlling said further actuating circuit and having an actuating circuit controlled by said transfer relay means, whereby actuation of said transfer relay means actuates said control relay means to complete said further actuating circuit for said heating means to heat said water while said thermostat is actuated to open said normally closed contacts thereof during transfer of water from said heating chamber.

5. A coffee maker comprising a heating chamber having an electrically operated hot water transfer valve for controlling transfer of water from said chamber, a water level detecting device having a first switch operated at a predetermined low water level and a second switch operated at a predetermined higher water level, first relay means controlling said water transfer valve and having an energizing circuit controlled by said second switch to prevent opening of said water transfer valve by said first relay means until water has reached said predetermined higher level in said chamber, means for completing a locked energization circuit for said first relay means independent of said second switch to maintain said first relay means energized during transfer of water from said heating chamber, control relay means having an actuating circuit controlled by said first relay means, an electrically operated gas valve, a gas burner connected to said gas valve for heating water in said chamber, an actuating circuit for said gas valve controlled by said control relay means to supply gas to said burner during transfer of water from said chamber, and second relay means controlling said locked energization circuit for said first relay means and having an actuating circuit controlled by said first switch, whereby upon water reaching said predetermined low level in said chamber, said second relay means will be operative to deenergize said first relay means to close said water transfer valve and to actuate said control relay means.

6. In combination in a coffee maker having a water heating chamber and an electrically operated cold water filling valve for controlling introduction of water into said heating chamber, a water level detecting device having a full level switch with normally closed contacts operable to open said contacts at a predetermined full water level in said chamber, and a low level switch with normally closed contacts operable to open said contacts at a predetermined low water level, first relay means having an energizing circuit including in series said normally closed contacts of said low level switch, second relay means having an energizing circuit controlled by normally open contacts of said first relay means and said normally closed contacts of said full level switch, a holding circuit for said second relay means independent of said normally open contacts of said first relay means but including said normally closed contacts of said full level switch, an energizing circuit for said cold water inlet valve controlled by normally open contacts of said second relay means, said second low level switch opening when water in said chamber rises to said predetermined low water level, said holding circuit maintaining said second relay means energized, said full level switch with normally closed contacts opening when said water in said chamber reaches said predetermined full water level to break said holding circuit and deenergize said second relay means to open said energizing circuit for said cold water inlet valve to close said valve.

7. In combination in a coffee maker having a water heating chamber and a plurality of coffee brewing chambers, a plurality of electrically operated water transfer valves respectively controlling the transfer of water from said heating chamber to said brewing chambers, relays respectively controlling the energization of said water transfer valves, a pressure control switch in circuit with said transfer valves, a manual switch for controlling each relay, an electrically operated refill valve controlling introduction of water into said water heating chamber, a refill circuit controlling actuation of said refill valve, an inter-locking circuit and a control relay means controlling said refill circuit whereby when one of the manual switches is set to transfer water, the refill circuit is controlled by the inter-locking circuit and the control relay so that the pressure control switch controls the refill operation, and when the pressure in said chamber builds up to a predetermined value, the aforesaid pressure control switch cuts in the water transfer valves and cuts out the refill circuit to prevent filling during the water transfer operation, an electrically controlled gas valve operatively connected to keep the water in said chamber boiling, and a thermostat controlled switch responsive to a predetermined temperature in said water heating chamber and having normally open contact in circuit with said transfer valves to prevent transfer of water from said heating chamber when the water is below said predetermined temperature and having normally closed contacts in circuit with said gas valve to actuate said gas valve when the temperature of the water in said chamber is below said predetermined temperature, and a gas valve actuating circuit by-passing said thermostat controlled switch controlled by said control relay, whereby when the manual switch is set to transfer water, the control relay opens the gas valve to heat the water in said chamber to boiling, thus cutting out the thermostat controlled switch.

8. A coffee maker comprising a water heating chamber, a coffee brewing chamber, a water transfer valve controlling the transfer of water from said heating chamber to said brewing chamber, an actuating circuit for said water transfer valve, transfer relay means for actuation to close a first pair of contacts in said transfer valve actuating circuit and to close a second pair of contacts, a manual switch for controlling actuation of said transfer relay means, control relay means for actuation to close a third pair of contacts and having an actuating circuit controlled by said second pair of contacts, an electrically operated water supply valve controlling refilling of said heating chamber, an actuating circuit for said water supply valve including said third pair of contacts, a condition sensitive means responsive to a predetermined condition of said water heating chamber to close a fourth pair of contacts in said transfer valve actuating circuit and to open a fifth pair of contacts in said supply valve actuating circuit, whereby when said manual switch is actuated to actuate said transfer relay means, said control relay means is actuated and said third pair of contacts is closed so that the supply valve actuating circuit is controlled by said fifth pair of contacts, and when said predetermined condition is present in said heating chamber, said condition sensitive means closes said fourth pair of contacts to complete the transfer valve actuating circuit and open said fifth pair of contacts to prevent refilling during water transfer operation.

9. In combination in a coffee maker having a heating chamber, a water level detecting device having a full level switch operable to open normally closed contacts at a predetermined high level of water in said chamber, and a low level switch with normally closed contacts operable to open said contacts at a predetermined low level of water in said heating chamber, an electrically operated cold water inlet valve controlling introduction of water into said heating chamber and having an actuating circuit, a low level relay means having an energizing circuit including in series said normally closed contacts of said low level switch, a refill relay means having an energizing circuit controlled by said low level relay means and having a holding circuit controlled by said normally closed contact of said low level switch, said refill relay means being energized upon energization of said low level relay means, and said refill relay means closing contacts in said cold water inlet valve actuating circuit to open said cold water inlet valve, said low level relay means being deenergized by opening of said normally closed contacts of said low level switch when water reaches said predetermined low level in said heating chamber, and said normally closed contacts of said full level switch opening when water in said chamber reaches said predetermined high level to break the holding circuit for said refill relay means and denergize said refill relay means, full level relay means having a pair of normally closed contacts and having an actuating circuit controlled by said normally closed contacts of said full level switch, an electrically operated hot water transfer valve controlling transfer of water from said heating chamber and having an actuating circuit including said normally closed contacts of said full relay means, said full level relay means being energized when the water in said heating chamber is below said predetermined high level through the normally closed contacts of said full level switch, but when the water reaches the predetermined high level, said full relay means is deenergized to close its normally open contacts in said hot water transfer valve actuating circuit to accommodate energization of said hot water transfer valve, said low level relay means, said refill relay means, and said full level relay means all being deenergized when water is at said predetermined high level in said heating chamber.

10. A coffee maker comprising a heating chamber having an electrically operated hot water transfer valve for controlling transfer of water from said chamber and having an actuating circuit, a water level detecting device having a first switch operated at a predetermined low level and a second switch operated at a predetermined higher water level, first relay means controlling said water transfer valve actuating circuit and having an energizing circuit controlled by said second switch to prevent opening of said water transfer valve by said first relay means until water has reached said predetermined higher level in said chamber, means for completing a locked energization circuit for said first relay means independent of said second switch to maintain said first relay means energized during transfer of water from said heating chamber, control relay means having an actuating circuit controlled by said first relay means, second relay means controlling said locked energization circuit for said first relay means and having an actuating circuit controlled by said first switch, whereby upon water reaching said predetermined low level in said chamber, said second relay means will be operative to deenergize said first relay means to close said water transfer valve and to actuate said control relay means, said control relay means being operable to open a first pair of contacts and to close a second pair of contacts upon actuation during transfer of water from said heating chamber, an electrically operated refill valve controlling introduction of water into said heating chamber and having an actuating circuit, refill relay means controlling said refill valve actuating circuit and having a first actuating circuit controlled by said first pair of contacts to prevent energization thereof during transfer of water from said heating chamber, and having a second actuating circuit including said second pair of contacts, and condition sensitive transfer control switch means operable to open a third pair of contacts in said second refill relay means actuating circuit when a predetermined condition exists in said heating chamber suitable for transfer of water from said chamber and operable to close a fourth pair of contacts in said water transfer valve actuating circuit, whereby said second refill relay means actuating circuit is controlled by said condition sensitive transfer control switch means to prevent refill when said predetermined condition exists in said heating chamber and said control relay means is actuated.

HERBERT E. KAMINKY.

References Cited in the file of this patent
UNITED STATES PATENTS

| Number | Name | Date |
|---|---|---|
| 1,346,898 | Kingsbury | July 20, 1920 |
| 1,581,758 | Morris | Apr. 20, 1926 |
| 1,688,092 | Smith | Oct. 16, 1928 |
| 1,694,492 | Tabler | Dec. 11, 1928 |
| 1,722,603 | Turner | July 30, 1929 |
| 1,822,433 | Brand | Sept. 8, 1931 |
| 1,869,720 | Strand et al. | Aug. 2, 1932 |
| 2,340,070 | McCauley et al. | Jan. 25, 1944 |
| 2,367,851 | Eaton | Jan. 23, 1945 |
| 2,394,885 | Baak | Feb. 12, 1946 |
| 2,422,974 | Newell | June 24, 1947 |
| 2,487,933 | Martin | Nov. 15, 1949 |
| 2,488,817 | Kaminky | Nov. 22, 1949 |
| 2,493,932 | Swanson | Jan. 10, 1950 |
| 2,544,836 | Hotvedt | Mar. 13, 1951 |
| 2,549,575 | Conley | Apr. 17, 1951 |
| 2,568,840 | Zees | Sept. 25, 1951 |